UNITED STATES PATENT OFFICE.

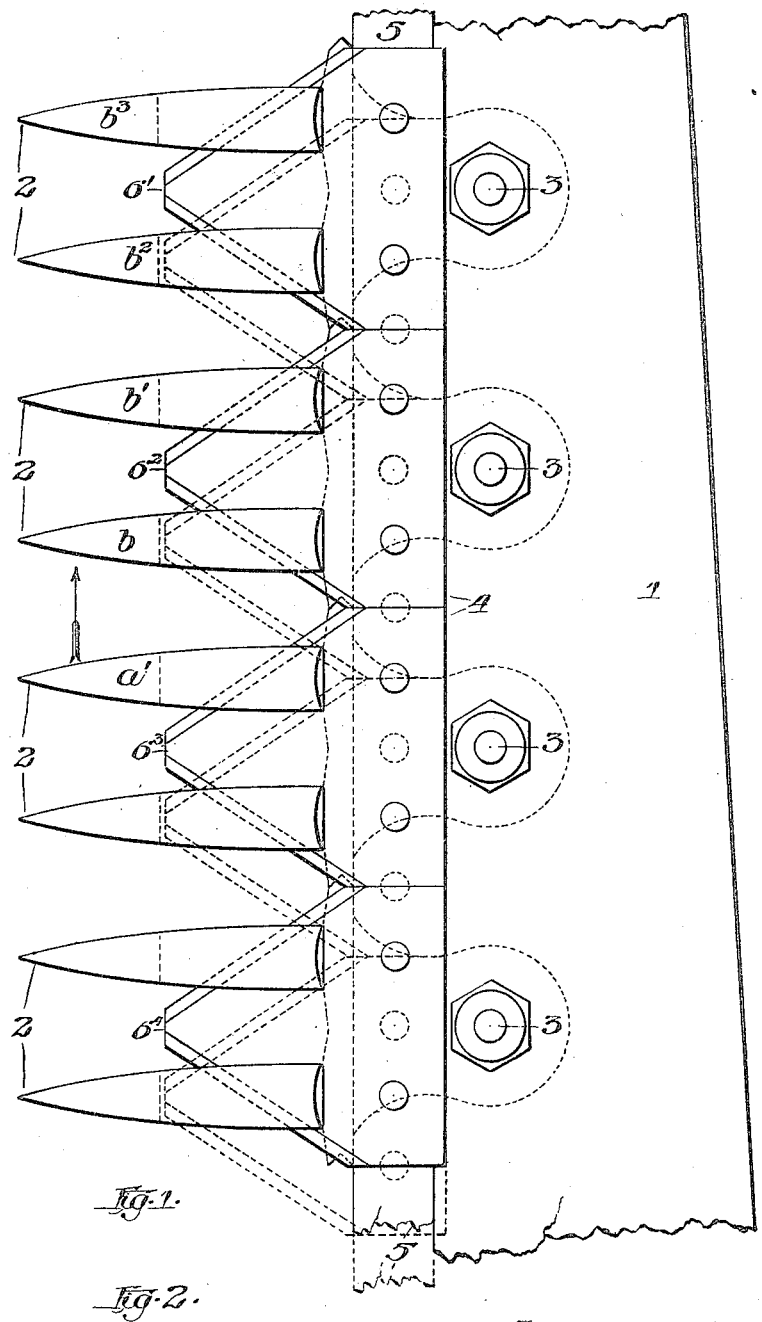

GEORGE H. BARTLETT, OF MADISON, WISCONSIN, ASSIGNOR TO INTERNATIONAL HARVESTER COMPANY, A CORPORATION OF NEW JERSEY.

CUTTING APPARATUS FOR MOWERS.

No. 821,978.     Specification of Letters Patent.     Patented May 29, 1906.

Application filed November 20, 1905. Serial No. 288,116.

*To all whom it may concern:*

Be it known that I, GEORGE H. BARTLETT, a citizen of the United States, residing at Madison, in the county of Dane and State of Wisconsin, have invented a new and useful Improvement in Cutting Apparatus for Mowers, of which the following is a complete specification.

This invention relates to cutting apparatus for mowers, and particularly to reciprocating cutters in combination with fixed cutters or guards; and it consists in a novel arrangement of the cutting-sections relative to the guards whereby the position of the former at the end of each stroke will be at or near a point intermediate of the longitudinal center lines of each pair of the latter.

The object of the invention is to prevent the clogging of the cutting apparatus caused by uncut grass being crowded and wedged between the knife-sections and the top and bottom of the slots in the guards.

The object is attained by the mechanism illustrated in the accompanying drawings, in which—

Figure 1 represents a plan view of so much of a cutting apparatus for mowers as is required to illustrate the invention; and Fig. 2 is an end elevation, partly in section, of the parts shown in Fig. 1.

Similar reference-numerals designate like parts throughout both views.

The reference-numeral 1 designates the finger-bar, to which are secured the guards 2, which are preferably made in pairs, each pair being secured to the finger-bar by means of single bolts 3.

4 represents the knife, comprising the knife-back 5 and sections $6'$ $6^2$ $6^3$, &c.

I prefer a common form of knife having what are usually termed "three-inch sections" as measured longitudinally relative to the knife-back and from center to center of their cutting-points.

I provide groups of two or more guards for each section and prefer to arrange them with equal intervening spaces, and the knife is reciprocated by the usual crank-and-pitman connection through a distance equal to the length of a section or to that of a group of guards and intervening spaces.

Heretofore the points of the sections when the knife was at the end of its reciprocating movement were made to register with the center of a guard, and when the number of guards was doubled for the same-sized sections those added were evenly spaced with respect to the others, so that the abutting edges of the sections were made to register with the added guards, as shown in dotted lines in Fig. 1. In the practical operation of a machine having the parts thus arranged it has been found that because of the points of the sections coming to a stop within the slots of the guards and owing to the diminished speed at which the knife was made to do the most of its work there resulted in consequence a much less effective cutting action and also a marked tendency to clog on account of the sections drawing more or less grass into the slots. This will be better understood when it is remembered that the tendency to clog is the most aggravated at the forward or point-engaging portion of the slot, this being due to the fact that a slowly-moving cutting edge is less effective than a rapidly-moving one. Hence the section-point moving slowly near the end of its travel instead of completely severing the grass drags much of it into the slot and there stops. Thus each successive stroke operates to augment the collection of choked material in the slot instead of passing through and clearing it out.

To overcome the above objections is the primary object of this invention, and it is accomplished by providing a plurality of guards for each section and so arranging the stroke of the knife relative to the guards as to cause the points of the sections to substantially register or coincide at the ends of the stroke of the knife with points intermediate of said guards or the medial lines of the intervening spaces, as indicated by the full-line position shown in Fig. 1. The result of such an arrangement will be, first, to cause the knife-sections to approach the slots of all the guards at a relatively high speed and to pass completely therethrough, thereby effectually preventing the clogging of same, and, second, the largest amount of the cutting action is secured during the greatest speed of the knife-sections, thus producing a high efficiency in work and a more even distribution of the cutting action throughout the length of the knife-stroke.

When the knife is caused to move in the direction indicated by the arrow in Fig. 1, the edges of sections $6^2$ and $6^3$, approaching and engaging guards $b'$ and $a'$, respectively, at practically the minimum speed, will have a minimum cutting effect; but as these sections pass through the slots in the said guards $b'$ and $a'$ and approach, respectively, the guards $b^2$ and $b$ they will be near mid-stroke with a positive acceleration and moving at the maximum speed and will produce a maximum cutting effect. As the sections in question, $6^2$ and $6^3$, emerge from the slots in the guards $b^2$ and $b$ and approach, but the points not reaching the guards $b^3$ and $b'$, respectively, at a negatively accelerating speed, the cutting of the grass between the guards $b^3$ and $b^2$ will be at a comparatively low speed. In the return stroke the action will be precisely similar. It is therefore seen that the grass which comes within the alternate spaces $a'\ b\ b'\ b^2$, &c., is cut with the knife-sections moving at a high speed, while the grass coming within the alternate spaces $b\ b'\ b^2\ b^3$, &c., is cut at a comparatively low rate of speed, thus resulting in an even distribution of the cutting action throughout the stroke of the knife, and it is further apparent that the points of the sections moving completely through the slots in the guards will prevent any material lodging therein.

What I claim as my invention, and desire to secure by Letters Patent, is—

1. A cutting apparatus for mowers comprising, in combination, reciprocating devices a series of pairs of guard-fingers having intervening spaces, a reciprocating knife comprising a series of sections in operative relation with said fingers, the stroke being such and said sections being so arranged relative to said pairs of fingers that their points when at the end of strokes of said knife in opposite directions will be approximately coincident with the medial lines of the intervening spaces between the members of adjacent pairs of guard-fingers.

2. A cutting apparatus for mowers comprising, in combination, reciprocating devices a series of groups of guard-fingers having substantially equal intervening spaces, a reciprocating knife comprising a corresponding series of sections in operative relation with said fingers, means for reciprocating said knife in a manner whereby the point of each section will register with a medial line of a space between two guards of one group of guard-fingers at the end of one stroke, and with a medial line of a space between two guards of an adjacent group at the end of the opposite stroke.

GEORGE H. BARTLETT.

Witnesses:
MARGARET A. SWEENEY,
J. C. WARNES.